United States Patent [19]

Fujimoto

[11] Patent Number: 5,268,591
[45] Date of Patent: Dec. 7, 1993

[54] UPPER POWER SUPPLY ARRANGEMENT FOR MOBILE VEHICULAR APPARATUS WITH AERIAL PLATFORM

[75] Inventor: Mineyuki Fujimoto, Okegawa, Japan

[73] Assignee: Kabushiki Kaisha Aichi Corporation, Saitama, Japan

[21] Appl. No.: 31,025

[22] Filed: Mar. 11, 1993

Related U.S. Application Data

[63] Continuation of Ser. No. 585,987, Sep. 21, 1990, abandoned.

[51] Int. Cl.$^5$ ............................................... H02G 1/02
[52] U.S. Cl. .......................................... 307/9.1; 182/2
[58] Field of Search ................. 307/9.1, 43, 84; 182/2

[56] References Cited

U.S. PATENT DOCUMENTS

| | | | |
|---|---|---|---|
| 3,554,319 | 1/1941 | Smith et al. ............................ | 182/46 |
| 5,107,954 | 4/1992 | Fujimoto ................................ | 182/2 |

FOREIGN PATENT DOCUMENTS

| | | |
|---|---|---|
| 60-174005 | 9/1985 | Japan . |
| 60-147923 | 10/1985 | Japan . |
| 61-81111 | 4/1986 | Japan . |
| 62-178108 | 8/1987 | Japan . |
| 62-268312 | 11/1987 | Japan . |
| 63-144995 | 9/1988 | Japan . |
| 63-173193 | 11/1988 | Japan . |
| 64-38273 | 3/1989 | Japan . |
| 64-38274 | 3/1989 | Japan . |
| 1134912 | 9/1989 | Japan . |
| 1231800 | 9/1989 | Japan . |
| 2-28895 | 2/1990 | Japan . |
| 263992 | 5/1990 | Japan . |
| 291789 | 7/1990 | Japan . |
| 2103089 | 8/1990 | Japan . |
| 2104988 | 8/1990 | Japan . |
| 2114308 | 9/1990 | Japan . |
| 2129108 | 10/1990 | Japan . |
| 2262813 | 10/1990 | Japan . |

OTHER PUBLICATIONS

English Translation of Japanese Patent No. 2-114308.
English Translation of Japanese Patent No. 2-104988.
English Translation of Japanese Patent No. 61-81111.

Primary Examiner—Steven L. Stephan
Assistant Examiner—Ben M. Davidson
Attorney, Agent, or Firm—Sandler Greenblum & Bernstein

[57] ABSTRACT

A mobile vehicular apparatus for moving an operator around a three-dimensional aerial work location includes a mobile vehicle having a vehicle body, a boom upwardly extensibly and downwardly collapsibly mounted on the vehicle body, a platform mounted on a distal end of the boom, and a manipulator mounted on the distal end of the boom in electrically insulated relation to the platform. The platform and the manipulator are electrically insulated from each other, and hydraulically operated generators are disposed respectively on the platform and the manipulator for energizing respectively electric systems mounted thereon. The electric systems on the platform and the manipulator are interconnected by an optical fiber cable. Since the platform and the manipulator are structurally electrically insulated from each other and their electric systems are electrically insulated from each other, the operator on the platform is protected for safety against electric shocks while electric cables or the like are being processed by the manipulator under the control of the operator.

17 Claims, 4 Drawing Sheets

UPPER POWER SUPPLY ARRANGEMENT FOR MOBILE VEHICULAR APPARATUS WITH AERIAL PLATFORM

This application is a continuation of application Ser. No. 07/585,987, filed Sep. 21, 1990, now abandoned.

BACKGROUND OF THE INVENTION

The present invention relates to an upper power supply arrangement for use with a mobile vehicular apparatus which includes an aerial platform or cabin and manipulators that are mounted on the distal end of an insulated boom, the aerial platform and the manipulator being completely electrically insulated from each other.

Some mobile vehicles with aerial platforms are used to handle electric cables supported on poles. While electric cables are being processed, it is often required that the electric cables be left "hot", i.e., an electric current flow through the electric cables, in order to prevent an undesirable power failure.

There is known a mobile vehicle with an aerial platform and manipulators which are mounted on the distal end of a boom. The operator who stands on the platform operates on a controller on the platform to actuate the manipulators for processing energized electric cables.

One conventional mobile vehicular apparatus with an aerial platform will be described with reference to FIG. 1 of the accompanying drawings. Actually, FIG. 1 shows a mobile vehicular apparatus with an aerial platform according to the present invention. Since the mobile vehicular apparatus according to the present invention has an appearance or external structure which is the same as that of the conventional mobile vehicular apparatus, the conventional mobile vehicular apparatus will be described with reference to FIG. 1. The mobile vehicular apparatus, generally denoted at 1, comprises an upper assembly including a platform 5 and a manipulator 6 and a lower assembly including a vehicle body 1a. The upper and lower assemblies are electrically insulated from each other by a distal end member 4a of a boom 4, the distal end member 4a being made of a highly electrically insulating material such as FRP (Fiber-Reinforced Plastic) or the like. The manipulator 6 is actuated by a hydraulic actuator which is disposed in the upper assembly and can be actuated by hydraulic pressure that is supplied from the lower assembly. The upper assembly has an electric control system (an upper CPU, etc.) for controlling various devices in the upper assembly, and the lower assembly also has an electric control system (a lower CPU, etc.) for controlling various devices in the lower assembly. Electric signals are transferred between these electric control systems through optical fibers. In this manner, the upper and lower assemblies are operatively connected to each other by hydraulic pressure hoses and an optical fiber cables, and hence are electrically insulated from each other.

Therefore, the electric insulation is sufficiently achieved between the upper and lower assemblies of the mobile vehicular apparatus. As shown in FIG. 4, signals from a master control arm 8 and an upper controller 9 which control the manipulator(slave manipulator arm) 6 are processed by, and control signals are supplied to the manipulator 6 from, an electric control system which includes an upper CPU 81, a servo driver 83, a power supply 84, and an AC/DC converter 85. The electric control system is energized by a single hydraulically operated generator G which is mounted on the platform 5, for example. Accordingly, it is impossible to electrically isolate the platform 5 and the manipulator 6 from each other. The operator M who rides on the platform 5 and operates the manipulator 6 is therefore exposed to dangers under high voltages from energized electric cables. The master control arm 8 is an arm mounted on the platform 5 and manually movable by the operator M. When the master control arm 8 is moved by the operator M, the manipulator 6 is operated, following the motion of the master control arm 8.

SUMMARY OF THE INVENTION

It is an object of the present invention to provide an upper power supply arrangement for a mobile vehicular apparatus with an aerial platform, the upper power supply arrangement providing a complete electrical insulation between the platform and a manipulator which is operatively coupled to and actuatable from the platform.

According to the present invention, a platform and a manipulator are structurally electrically insulated from each other, and independent power supply units such as hydraulically operated generators are mounted respectively on the platform and the manipulator. Electrical systems on the platform and the manipulator are energized by the respective power supply units.

The platform and the manipulator are structurally electrically insulated from each other and their electric systems are also electrically insulated from each other. Therefore, the operator on the platform is protected for safety against electric shocks and can operate the manipulator highly efficiently while energized electric cables or the like at a high work location are being processed by the manipulator under the control of the operator.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
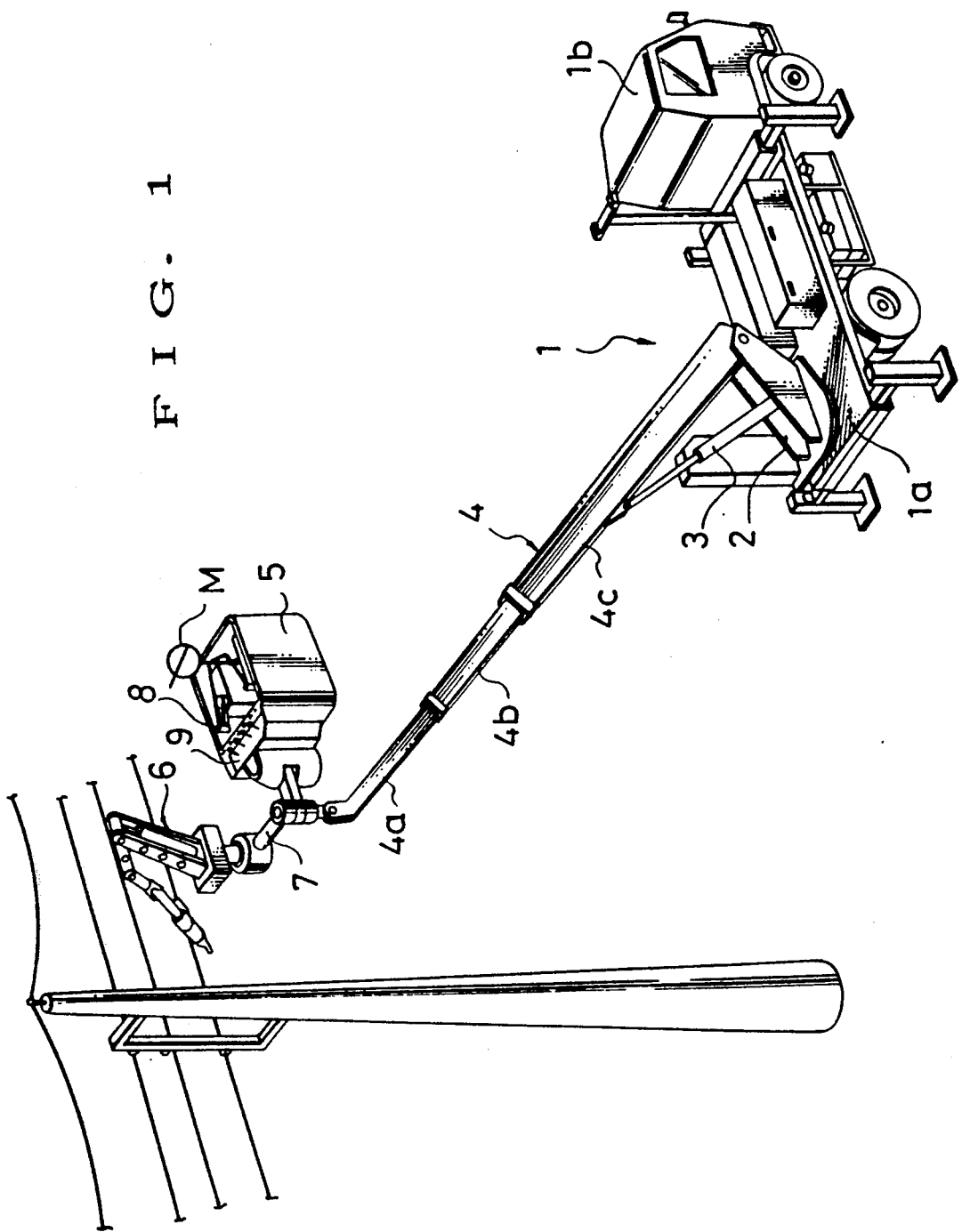
FIG. 1 is a perspective view of a mobile vehicular apparatus with an aerial platform, incorporating an upper power supply arrangement according to the present invention.

FIG. 1 shows a mobile vehicular apparatus with an aerial platform, incorporating an upper power supply arrangement according to the present invention. The mobile vehicular apparatus includes an aerial platform 5 and a manipulator 6.

The mobile vehicular apparatus includes a mobile vehicle having a driver's cabin 1b and a vehicle body 1a. The vehicle body 1a supports a turntable 2 on which there is mounted a telescopic boom 4 which is upwardly extensible and downwardly collapsible, i.e., vertically swingable, by a cylinder 3. The telescopic boom 4 comprises three boom members, i.e., a distal boom member 4a, an intermediate boom member 4b, and proximal boom member 4c. The distal boom member 4a and the intermediate boom member 4b are slidably movable into and out of the proximal boom member 4c by hydraulic cylinders (not shown) disposed in the telescopic boom 4. The platform 5 and the manipulator 6 are mounted on the tip end of the distal boom member 4a so that the platform 5 and the manipulator 6 can horizontally and vertical swing with respect to the boom 4.

The platform 5 is in the form of an upwardly open box or a box-shaped bucket for carrying an operator M therein, and is held in a horizontal position at all times irrespective of whether the boom 4 is raised or lowered. The platform 5 supports a master control arm 8 for controlling operation of the manipulator 6 and a controller 9 for controlling turning movement, vertical movement, and telescopic movement of the boom 4 and also operation of the manipulator 6 in coaction with the master control arm 8. The master control arm 8 is manually operated by the operator M, and an operation signal produced by the master control arm 8 as operated by the operator M is processed by an upper CPU 11 (FIG. 2) and transmitted from the upper CPU 11 to a servo driver 13 for controlling operation of a hydraulic servo system for the manipulator 6. The manipulator 6 is thus operated in a pattern corresponding to the pattern of movement of the manually operated master control arm 8.

The distal boom member 4a on which the platform 5 and the manipulator 6 are supported is made of FRP (Fiber-Reinforced Plastic) which is a highly electrically insulating material. The manipulator 6 is supported on the distal boom member 4a by a support arm 7 positioned near the platform 5, the support arm 7 being also made of FRP. Therefore, the vehicle body 1a, the platform 5, and the manipulator 6 are electrically insulated from each other by the distal boom member 4a and the support arm 7.

Figure 2:
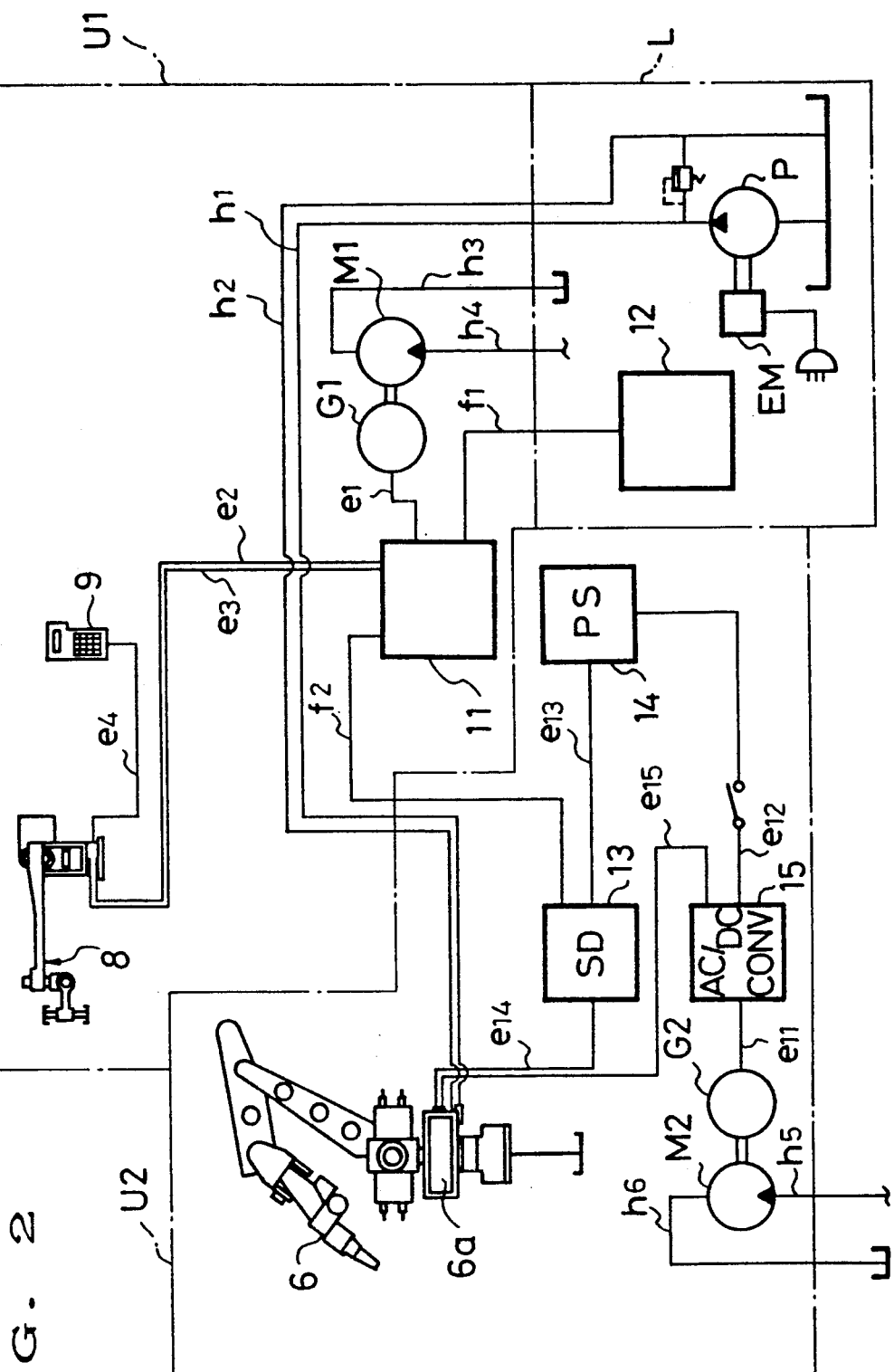
FIG. 2 is a diagram of an electrohydraulic circuit of the upper power supply arrangement.

FIG. 2 shows an electrohydraulic circuit of an upper power supply arrangement, for controlling operation of the manipulator 6. The electrohydraulic circuit is divided into a lower region L, an upper platform region U1, and an upper manipulator region U2 as indicated by the dot-and-dash lines.

The lower region L includes a lower CPU 12 and a hydraulic pump P drivable by an electric motor EM mounted on the vehicle body 1a. The hydraulic pump P is hydraulically connected to the manipulator 6 through hydraulic lines h1, h2 which supply working oil pressure from the hydraulic pump P to the manipulator 6. The lower CPU 12 is electrically connected to the upper CPU 11 in the upper platform region U1 through an optical fiber cable f1 so that optical signals can be exchanged between the CPUs 12, 11. The lower CPU 12 is supplied with electric energy from the motor vehicle 1a.

The upper platform region U1 includes, in addition to the master control arm 8 and the controller 9, the upper CPU 11, a DC generator G1 (first power supply unit) for supplying drive electric power to the upper CPU 11 through an electric wire e1, and a first hydraulic motor M1 for driving the DC generator G1. The master control arm 8, the controller 9, the CPU 11, the DC generator G1, and the first hydraulic motor M1 are mounted on the platform 5. The first hydraulic motor M1 is actuated by hydraulic pressure which is supplied from the vehicle body 1a through hydraulic lines h3, h4. An operation signal which is sent from the master control arm 8 and the controller 9 through electric wires e2, e3, e4 is applied to the upper CPU 11, processed thereby, and converted into an optical signal, which is then transmitted to the servo driver 13 in the upper manipulator region U2 through an optical fiber cable f2.

The upper manipulator region U2 includes, in addition to the manipulator 6, the servo driver 13, a power supply 14, an AC/DC converter 15, an AC generator G2 (second power supply unit), and a second hydraulic motor M2. The servo driver 13, the power supply 14, the AC/DC converter, the AC generator G2, and the second hydraulic motor M2 are installed on the manipulator 6. The second hydraulic motor M2 is actuated by hydraulic pressure which is supplied from the vehicle body 1a through hydraulic lines h5, h6, thereby driving the AC generator G2. An alternating current generated by the AC generator G2 is sent through an electric wire e11 to the AC/DC converter 15, which converts the alternating current into a direct current that is supplied to the power supply 14 through an electric wire e12. The current which is delivered from the power supply 14 to the servo driver 13 through an electric wire e13 is converted into a control current for a solenoid-operated valve 6a for controlling operation of the manipulator 6, in response to the optical signal from the upper CPU 11. The control current is then sent from the servo driver 13 to the solenoid-operated valve 6a through an electric wire e14. Therefore, operation of the solenoid-operated valve 6 is controlled to move the manipulator 6 in response to movement of the master control arm 8 and operation of the controller 9.

With the upper power supply arrangement according to the above embodiment, the distal boom member 4a and the support arm 7 for the manipulator 6 are made of an electrically insulating material such as FRP or the like, so that they are structurally electrically insulated. Moreover, the generators G1, G2 are mounted respectively on the platform 5 and the manipulator 6, and the upper platform and manipulator regions U1, U2 are hydraulically and optically connected to each other by hydraulic lines and an optical fiber cable, so that the platform 5 and the manipulator 6 are completely electrically insulated from each other. Therefore, the operator M on the platform 5 is protected for safety against electric shocks and can operate the manipulator 6 with high efficiency while energized electric cables at an aerial work location are being processed by the manipulator 6 under the control of the operator M through the master control arm 8 and the controller 9.

While the DC generator is located in the upper platform region U1 and the AC generator is located in the upper manipulator region U2, the present invention is not limited to such a generator selection, but either an AC or DC generator may be employed in either of the upper platform and manipulator regions U1, U2.

Another mobile vehicular apparatus with an aerial platform or cabin, which incorporates an upper power supply arrangement according to the present invention will be described below with reference to FIG. 3.

The mobile vehicular apparatus, generally denoted at 101, includes a motor vehicle having a driver's cabin 101b and a vehicle body 101a. The vehicle body 101a supports a turntable 102 on which there is mounted a telescopic boom 104 which is upwardly extensible and downwardly collapsible by a cylinder 103. The telescopic boom 104 comprises three boom members 104a, 104b, 104c. The boom member 104a at the distal end of the boom 104 supports an operator's cabin (platform) 105 through a support 105a which can be vertically and horizontally swung with respect to the boom 104. A pair of manipulators 106 is also operatively mounted on the support 105a.

The distal boom member 104a is made of a highly electrically insulating material. The manipulators 106 are supported on the support 105a by a support arm 107 which is also made of a highly electrically insulating material. The manipulators 106 are disposed in front of the cabin (platform) 105. Therefore, the vehicle body 101a, the cabin (platform) 105, and the manipulators 106 are electrically insulated from each other.

Figure 3:
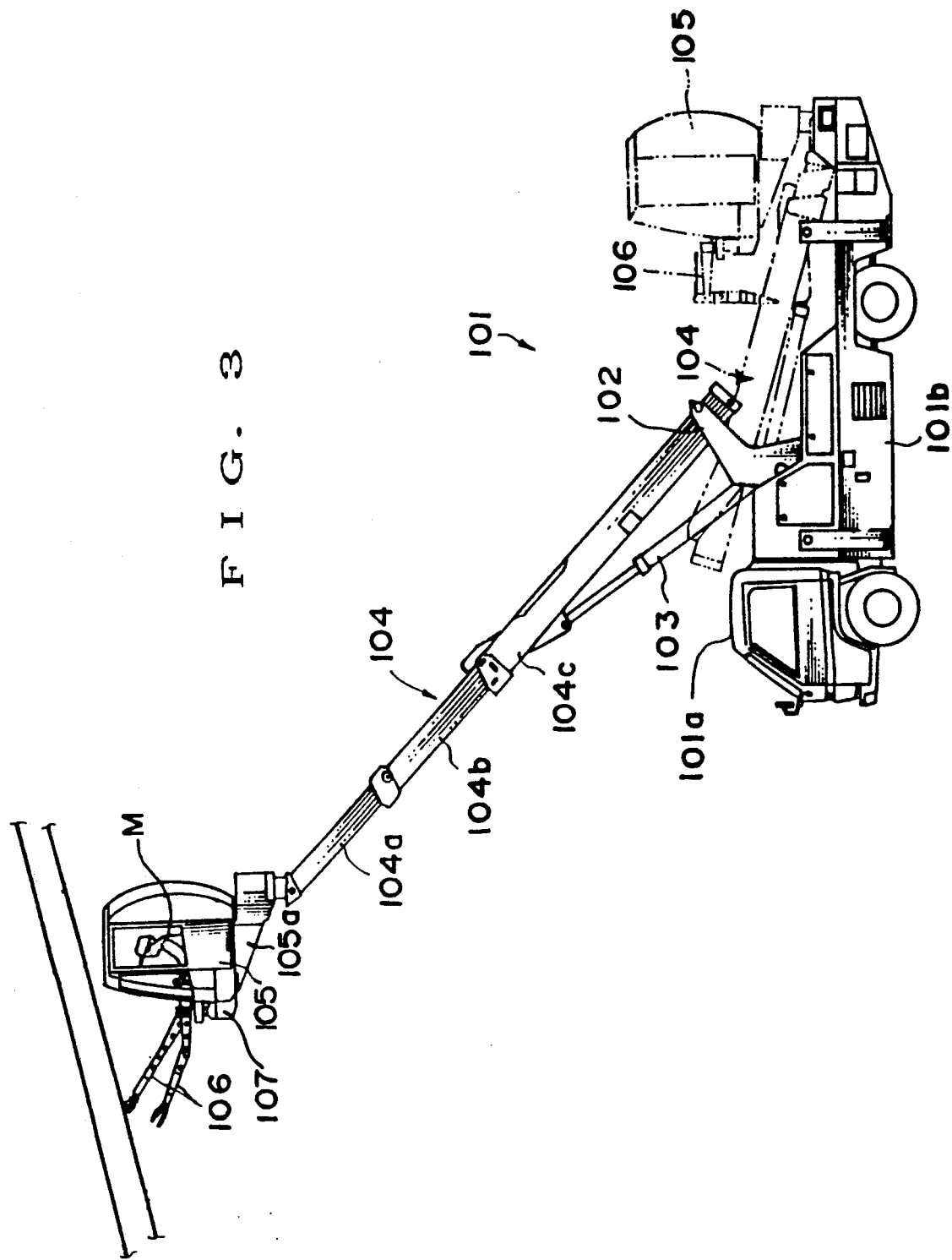
FIG. 3 is a side elevational view of another mobile vehicular apparatus with an aerial platform, which incorporates an upper power supply arrangement according to the present invention.
Figure 4:
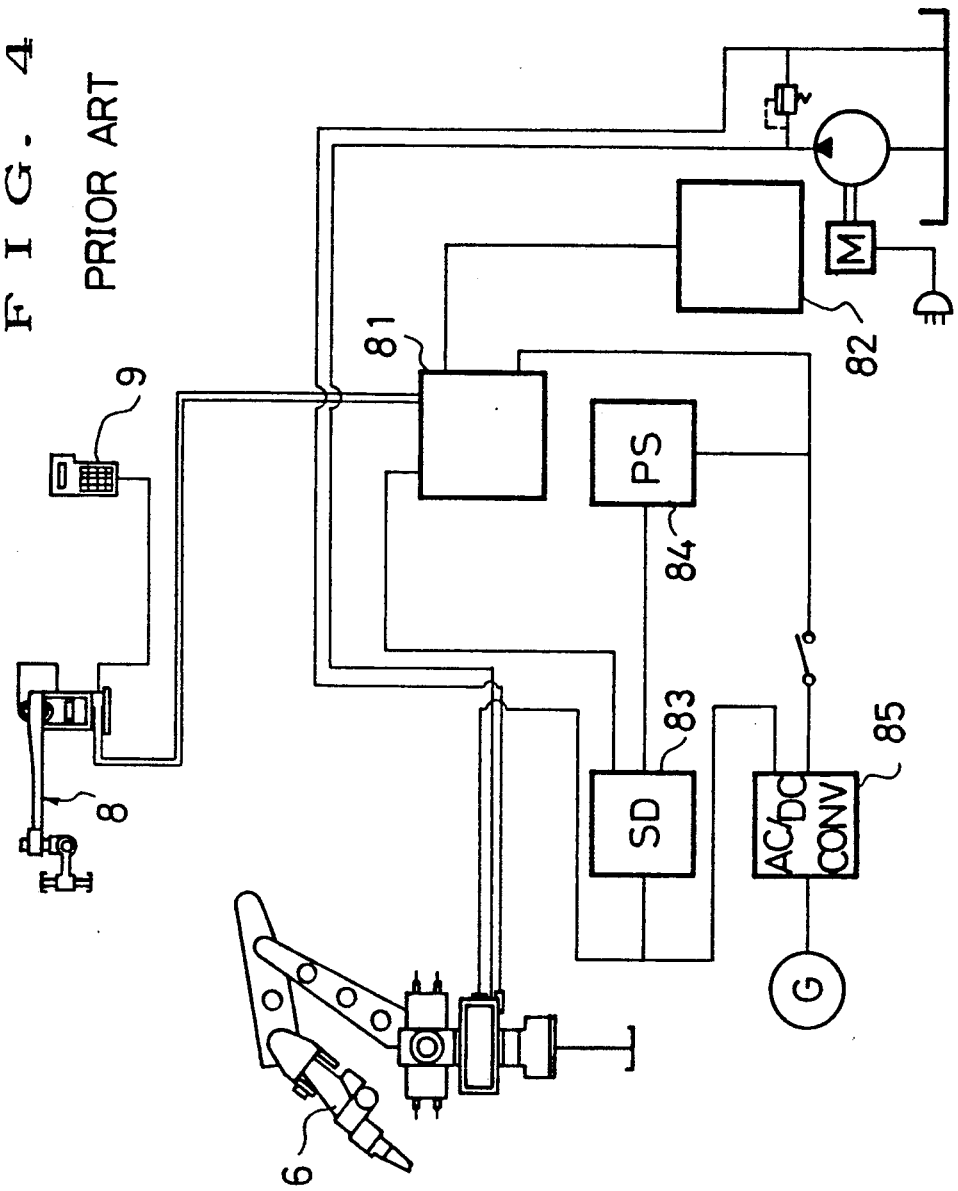
FIG. 4 is a diagram of an electrohydraulic circuit of a conventional upper power supply arrangement.

The upper power supply arrangement employed in the mobile vehicular apparatus 101 shown in FIG. 3 is the same as that which is shown in FIG. 2. Thus, hydraulically operated electric generators are mounted respectively on the cabin (platform) 105 and the manipulators 106, and hydraulically and optically connected to each other by hydraulic lines and an optical fiber cable.

In the above embodiments, the generators are driven by the respective hydraulic motors. However, the generators may be operated by other means such as pneumatic motors or the like according to the present invention. Alternatively, batteries may be employed instead of the generators and associated components.

Although certain preferred embodiments have been shown and described, it should be understood that many changes and modifications may be made therein without departing from the scope of the appended claims.

What is claimed is:

1. An upper power supply arrangement on an apparatus for moving an operator around a three-dimensional aerial work location, the apparatus including a mobile vehicle having a vehicle body, a boom upwardly extensibly and downwardly collapsibly mounted on the vehicle body, a platform, for carrying an operator therein, mounted on a distal end of the boom, and a manipulator mounted on the distal end of the boom in electrically insulated relation to the platform, at least a part of the boom being made of an electrically insulating material so as to electrically insulate the platform and the manipulator from the vehicle body, said upper power supply arrangement comprising:
   a first electrical system installed on said platform;
   a first power supply unit mounted on said platform, for energizing said first electrical system installed on said platform;
   a second electrical system installed on said manipulator for electrically driving said manipulator;
   a second power supply unit mounted on said manipulator, for energizing said second electrical system installed on said manipulator; and
   an optical fiber cable interconnecting said first and second electrical systems, wherein said platform and said manipulator are electrically insulated from one another.

2. An upper power supply arrangement according to claim 1, wherein said first and second power supply units comprise electric generators, respectively.

3. An upper power supply arrangement according to claim 2, further including hydraulic motors rotatable by hydraulic pressure supplied from said motor vehicle, for driving said electric generators, respectively.

4. An upper power supply arrangement according to claim 2, further including pneumatic motors rotatable by pneumatic pressure supplied from said motor vehicle, for driving said electric generators, respectively.

5. An upper power supply arrangement according to claim 1, wherein said first and second power supply units comprise batteries, respectively.

6. An upper power supply arrangement according to claim 1, wherein said platform comprises a box-shaped bucket for carrying an operator to operate said manipulator.

7. An upper power supply arrangement according to claim 1, wherein said platform comprises a cabin for accommodating an operator to operate said manipulator.

8. An upper power supply arrangement according to claim 7, wherein said manipulator comprises a pair of manipulators disposed in front of said cabin in electrically insulated relation thereto.

9. An upper power supply arrangement on an apparatus for moving an operator around a three-dimensional aerial work location, the apparatus including a mobile vehicle having a vehicle body, a boom upwardly extensibly and downwardly collapsibly mounted on the vehicle body, said boom having a distal end extending away from the vehicle body, a platform, for carrying an operator therein, mounted on said distal end of said boom, and a manipulator mounted on said distal end of said boom in electrically insulated relation to said platform, said upper power supply arrangement comprising:
   a first electrical system installed on said platform, said electrical system comprising a master control arm electrically connected to a central processing unit;
   a first power supply unit mounted on said platform, for energizing said first electrical system installed on said platform;
   a second electrical system installed on said manipulator for electrically driving said manipulator, said second electrical system comprising a servo driver which receives optical signals from said first electrical system to control movements of said manipulator;
   a second power supply unit mounted on said manipulator, for energizing said second electrical system installed on said manipulator; and
   an optical fiber cable interconnecting said first and second electrical systems, wherein said central processing unit is optically connected to said second electrical system via said optical cable, and said platform and said manipulator are electrically insulated from one another.

10. The upper power supply arrangement of claim 9, wherein said vehicle body is electrically insulated from said platform.

11. The upper power supply arrangement of claim 9, wherein said vehicle body is electrically insulated from said manipulator.

12. The upper power supply of claim 9, wherein said platform comprises a box-shaped bucket for carrying an operator to operate said manipulator.

13. The upper power supply arrangement of claim 1, further comprising an optical fiber cable which interconnects said first electrical system with a third electrical system located on the vehicle body.

14. The upper power supply arrangement of claim 13, wherein said third electrical system is supplied with electricity by a motor located within the vehicle body.

15. The upper power supply arrangement of claim 1, said first electrical system further comprising:
   a master control arm electrically connected to a central processing unit, wherein said central processing unit is optically connected to said second electrical system via said optical fiber cable;
   said first power supply comprising a DC generator driven by a first hydraulic motor installed on said platform, said second hydraulic motor being interconnected with the vehicle body by hydraulic lines.

16. The upper power supply arrangement of claim 1, said second electrical system further comprising:
   a servo driver which receives optical signals from said first electrical system to control movements of said manipulator;
   said second power supply unit further comprising: an AC generator and a second hydraulic motor installed on said manipulator, said second hydraulic motor being interconnected with the vehicle body by hydraulic lines.

17. The upper power supply arrangement of claim 9, further comprising an optical fiber cable which interconnects said first electrical system with a third electrical system located on the vehicle body.

* * * * *

UNITED STATES PATENT AND TRADEMARK OFFICE
CERTIFICATE OF CORRECTION

PATENT NO. : 5,268,591
DATED : December 7, 1993
INVENTOR(S) : Mineyuki FUJIMOTO

It is certified that error appears in the above-indentified patent and that said Letters Patent is hereby corrected as shown below:

On the cover, in section [75], "Inventor", change "Okegawa" to ---Saitama---.

Signed and Sealed this

Twenty-sixth Day of August, 1997

Attest:

BRUCE LEHMAN

Attesting Officer

Commissioner of Patents and Trademarks